United States Patent [19]

Watts

[11] Patent Number: 4,707,882
[45] Date of Patent: Nov. 24, 1987

[54] PNEUMATIC DAMPER

[76] Inventor: John R. Watts, 87 Well Street, Middle Brighton, Victoria 3186, Australia

[21] Appl. No.: 837,684

[22] Filed: Mar. 10, 1986

[51] Int. Cl.$^4$ ............................................. E05F 3/00
[52] U.S. Cl. ........................................................ 16/66
[58] Field of Search .......... 16/58, 66, 72, 84, DIG. 9, 16/DIG. 10; 188/285

[56] References Cited

U.S. PATENT DOCUMENTS

| | | | |
|---|---|---|---|
| 1,528,195 | 3/1925 | Bush | 16/66 |
| 2,091,904 | 8/1937 | Baumann | 16/66 |
| 2,453,956 | 11/1948 | Angell | 16/66 |
| 3,059,269 | 10/1962 | Selinger | 16/66 |
| 3,083,399 | 4/1963 | Moran | 16/66 |
| 3,708,826 | 1/1973 | Larson | 16/66 |
| 4,230,309 | 10/1980 | Schnitzius | 16/66 |
| 4,382,311 | 5/1983 | Watts | 16/66 |

Primary Examiner—Kurt Rowan
Attorney, Agent, or Firm—Larson and Taylor

[57] ABSTRACT

A pneumatic damper for particular use as a door closer comprising a cylinder closed at one end having a piston axially slidable therein to define a pressurizable chamber between the piston and the closed end of the cylinder, the piston having a mechanism to allow air to flow past the piston when the piston slides axially away from the closed end and to prevent airflow past the piston as the piston moves towards the closed end, an elongate arm secured to the piston to extend out of the cylinder, the arm being displaceable to cause the piston to slide within the cylinder and an adjustable airflow control on the wall of the cylinder at a selected position to allow variation of flow of air between the piston and cylinder wall at the selected position, to cause, in use, a sudden reduction in the air pressure within the chamber.

17 Claims, 14 Drawing Figures

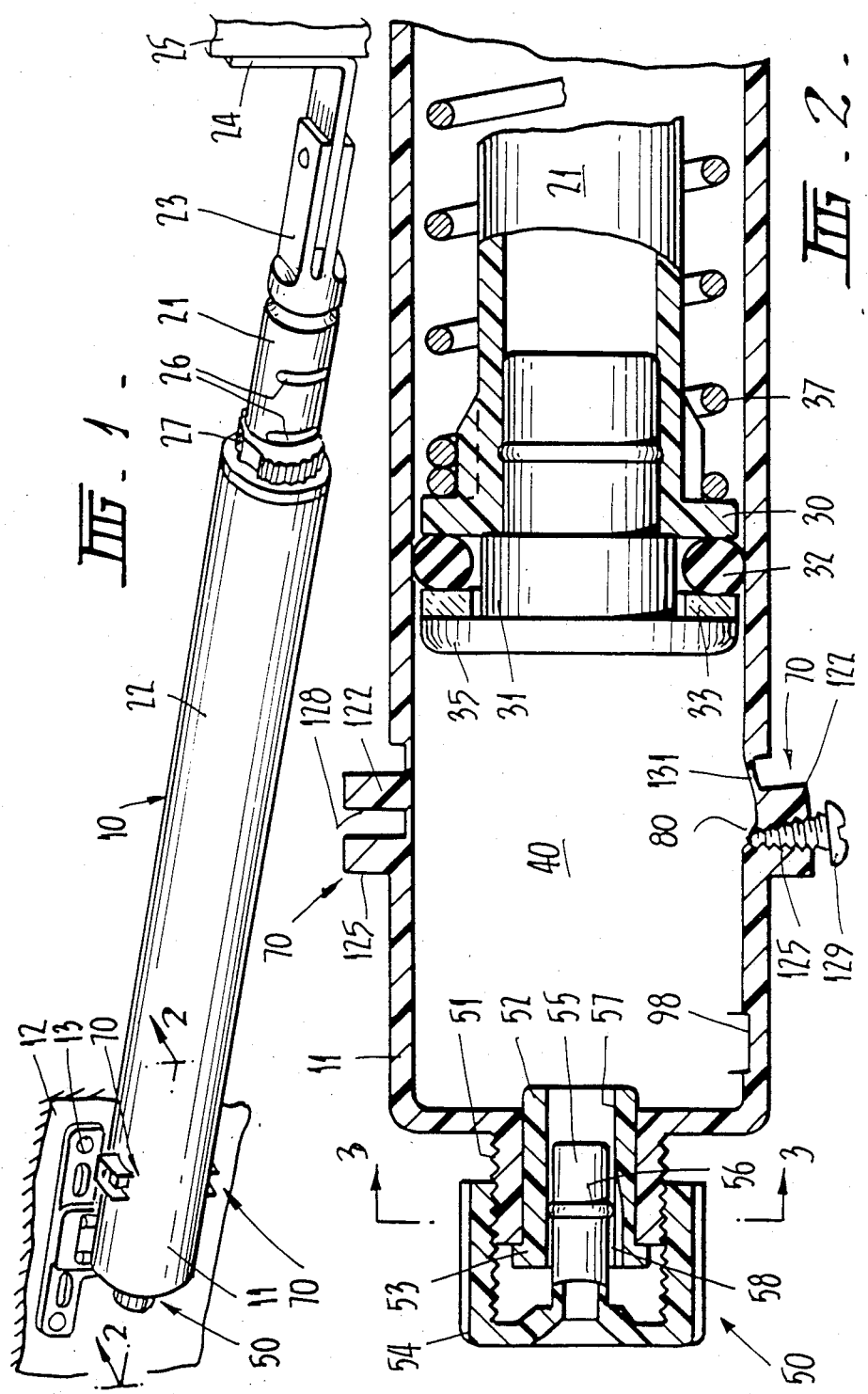

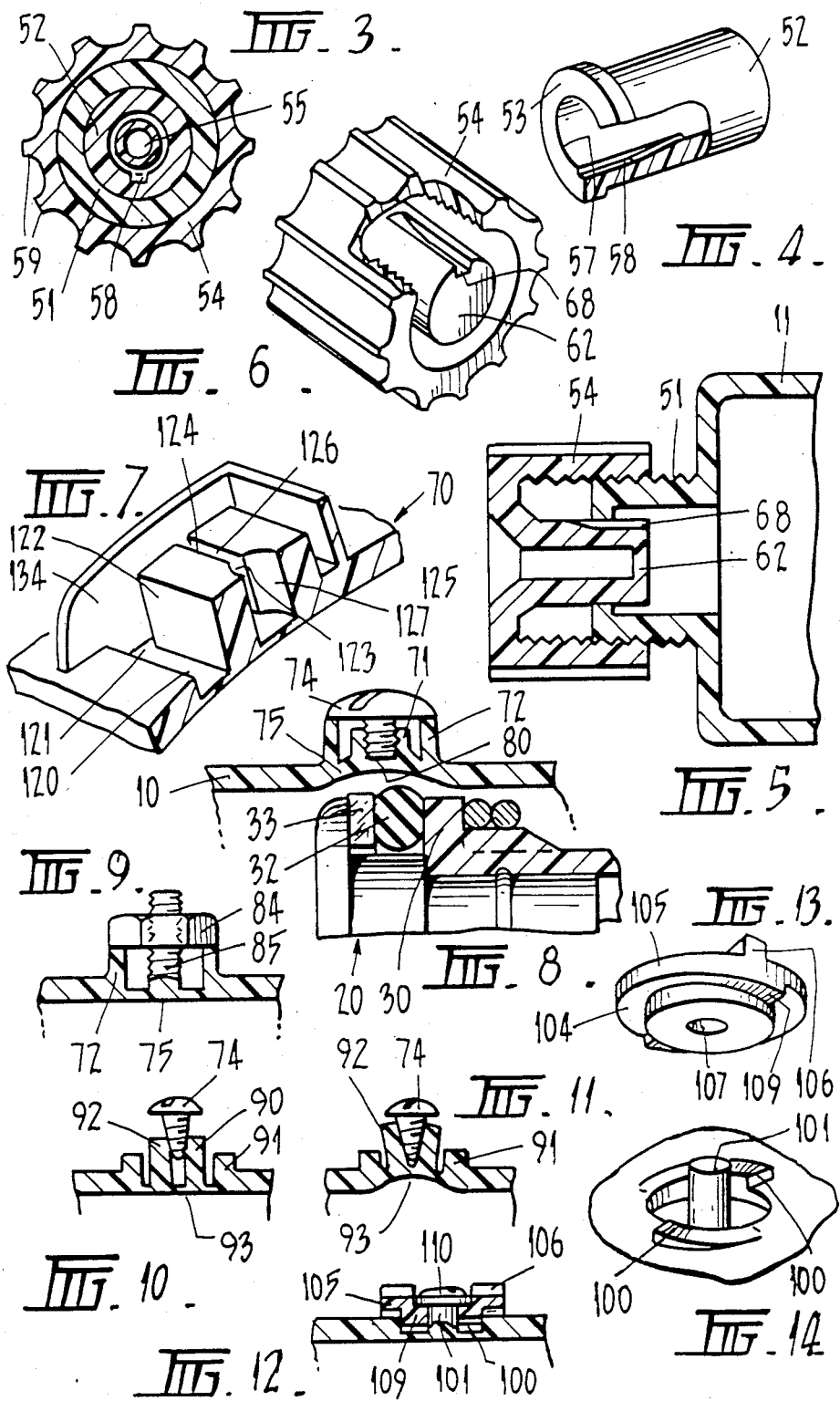

PNEUMATIC DAMPER

This invention relates to door closers and in particular relates to pneumatic dampers for use as door closers in domestic applications to close screen doors.

The inherent nature of a screen door is to provide a light door structure that can be closed and locked across a door frame to allow flow of air both in and out of the building whilst at the same time to prevent entry of unwanted insects. The inherent characteristics of a screen door require the door to be generally closed. Thus it is common practice to attach pneumatic door closers to screen doors to ensure that the door automatically closes. To provide the option of leaving the door open it is common practice to provide door closers with means to hold the door ajar. A typical door closer incorporating such means as described in the applicant's Australian Pat. No. 544,943. In manufacturing and marketing door closers cost is a critical parameter and thus manufacturers are constantly striving to produce door closers for the cheapest possible price whilst at the same time providing the features wanted by the customer. One problem encountered in the manufacture of door closers is that the size, weight and scale of the doors vary and thus the physical demands associated with the requirements of the door closer vary considerably. The present invention is aimed at providing a pneumatic damper that is simple and cheap to manufacture but has the adjustability to allow it to be used in a variety of situations especially as a versatile door closer.

According to the present invention there is provided a pneumatic damper comprising a cylinder closed at one end having a piston axially slidable therein to define a pressurizable chamber between the piston and the closed end of the cylinder, the piston having means to allow air to flow past the piston when the piston slides axially away from the closed end and to prevent airflow past the piston as the piston moves towards the closed end, an elongate arm secured to said piston to extend out of the cylinder, the arm being displaceable to cause the piston to slide within the cylinder and an adjustable airflow control means on the wall of the cylinder at a selected position to allow variation of flow of air between the piston and cylinder wall at said selected position, to cause, in use, a sudden reduction in the air pressure within the chamber.

Preferably the adjustable airflow control means comprises means to selectively vary the gap between at least one part of the periphery of the piston and the adjacent part of the cylinder wall. In a preferred embodiment the adjustable airflow control means comprises means external of the cylinder wall causing at least part of the internal wall to deflect away from the adjacent part of the piston periphery. The part of the cylinder wall that deflects may be a membrane having a threaded spigot extending radially outwardly therefrom. The means to cause the deflection of the membrane may comprise a screw in threaded engagement with the spigot and abutment means formed on the external surface of the wall in which the underside of the head of the screw engages so that as the screw turns axial movement of the screw is prevented but the spigot and membrane are drawn outwardly to deflect the inner wall of the cylinder away from the periphery of the piston.

In a preferred embodiment an adjustable bleed valve is provided at said closed end to allow release of controlled air pressure within the chamber.

According to a further aspect of the present invention there is provided a pneumatic door closer comprising a cylinder closed at one end having a piston axially slidable therein to define a chamber between the piston and the closed end of the cylinder, the piston having means to allow air to flow past the piston when the piston slides axially away from the closed end and to prevent airflow past the piston as the piston moves towards the closed end, the cylinder being securable to one part of the door assembly, an elongate arm secured to said piston to extend out of the cylinder to be secured to another part of the door assembly, biasing means urging the piston to the closed end of the cylinder thereby compressing the air within the chamber and an adjustable airflow control means on the wall of the cylinder to allow variation of flow of air between the piston and cylinder wall, to cause, in use, a sudden reduction in the air pressure within the chamber.

It is preferred that the majority of the components of the door closer be moulded in plastics.

Various embodiments of the present invention will now be described by way of example only with reference to the accompanying drawings, in which:

FIG. 1 is a perspective view of a door closer attached across two components of a door assembly;

FIG. 2 is a cross-sectional view taken along the line 2—2 of FIG. 1 and illustrating a cross-section of the closed end of the door closer;

FIG. 3 is a cross-sectional view taken along the line 3—3 of FIG. 2 illustrating a bleed valve;

FIG. 4 is a cut-away perspective view of the bleed valve illustrated in FIG. 3;

FIG. 5 is a cross-sectional view of the closed end of the door assembly illustrating an alternative form of bleed valve;

FIG. 6 is a cut-away perspective view of the bleed valve illustrated in FIG. 5;

FIG. 7 is a cut-away perspective view of airflow control means on the exterior of a cylinder forming part of the door closer;

FIG. 8 is a part sectional view of the cross-section of the door closer illustrating operation of an airflow control means;

FIG. 9 illustrates another form of airflow control means;

FIGS. 10 and 11 illustrate further forms of airflow control means;

FIG. 12 is a cross-sectional view of a still further form of airflow control means;

FIG. 13 is a perspective view from the underside of a component of the airflow control means illustrated in FIG. 11; and FIG. 13 is a perspective view of the adjacent portion of the cylinder wall that cooperates with the component illustrated in FIG. 12.

The pneumatic door closer illustrated in the accompanying drawings, comprises, as shown in FIGS. 1 and 2, an elongate cylinder 10 having a closed end 11 that is pivotally secured to a face of the door 12 via a bracket assembly 13. The cylinder 10 contains a piston 20 formed on an arm 21 that extends co-axially of the cylinder out of the end 22 of the cylinder. The arm 21 is coupled to a bifurcated bracket 23 that is pivotally secured to a right angle bracket 24 that is in turn screwed against the door jam 25.

As shown with particular reference to FIG. 2 the arm 21 is in the form of a cylindrical rod terminating in a shoulder 30 at one end. The rod is of hollow construction and a suitable plug 31 is position in the end of the rod to retain an O-ring 32 and a felt washer 33 between a shoulder 35 of the plug 31 and the shoulder 30 on the arm 21. The shoulder 30 on the arm also supports one end 36 of a coil spring 37 that extends co-axially with the arm 21 to engage the end 22 of the cylinder. The coil spring 37 operates to urge the piston towards the closed end 11 of the cylinder 10 and is compressed as the door is opened thereby pulling the arm 21 and piston to the opposite end of the cylinder. The space between the closed end 11 of the cylinder and the piston 20 is an air chamber 40 and the pressure of air within this chamber 40 resists displacement of the piston 20 by the spring 37. The location of the O-ring 32 and felt washer 33 causes the O-ring to be displaced from the shoulder 30 as the piston is drawn axially out of the cylinder as the door is opened thereby allowing air to flow past the piston and into the chamber 40. However, when the piston moves towards the closed end of the cylinder the O-ring is pressed into engagement with the shoulder 30 preventing flow of air past the piston. This has the effect of compressing the air within the chamber 40 thereby slowing down the inward movement of piston urged by the spring 37.

To allow the pressure within the chamber 40 to be dissipated it is conventional to have a bleed valve 50 at the closed end 11 of the cylinder. The bleed valve 50 is traditionally adjustable and two forms are illustrated with reference to FIGS. 2 to 6. Both forms operate by adjusting the cross-sectional area of an orifice. In the embodiment illustrated in FIGS. 2, 3 and 4 the closed end 11 of the cylinder terminates in an outwardly projecting threaded spigot 51 into which is located a cylindrical sleeve 52 terminating one end in an enlarged shoulder 53 that engages the end of the spigot 51. An internally threaded cap 54 screws onto the spigot 51 and is provided with a projection 55 that co-axially fits within the sleeve 52. The projection 55 has an annular bead 56 that is a force fit within the sleeve to prevent passage of air between the projection and the sleeve. However as shown in FIGS. 2 and 4 the internal bore 57 of the sleeve 52 is provided with a tapered groove 58 which in use, allows air to escape past the bead 56 on the projection 55. The amount of air that is released past the bead 56 depends on the position of the bead relative to the groove 58. This position is dependent on how far the cap 54 is screwed onto the spigot 51. The cap 54 has a serrated outer periphery 59 which can be turned to vary the position of the bead 56 within the bore 57 of the sleeve 52 to allow the rate of release of air from within the chamber 40 to be adjustable.

In the embodiment illustrated in FIGS. 5 and 6 the tapered bypass passageway 68 of the bleed screw 50 is provided on the projection 62 of the threaded cap 54 and the internal sleeve is dispensed with. The rate of air release operates in the same manner as the previous embodiment namely in dependence on the position of the projection 62 within the wall of the spigot 51. This position is dependent on the amount that the cap 54 has been screwed onto the spigot 51.

Although the provision of an adjustable bleed screw at the end of the cylinder allows the rate at which the piston moves in the cylinder to be adjustable to thereby effect the rate of closing of the door by the closer, it is desired in many closures of this kind to introduce a feature that enables the door to snap shut against the door latch. To this end the door closer is provided with means to provide a sudden reduction in the reactive force generated by the pressure of the air within the chamber that has the effect of causing the spring force to slam the door shut against its latch. The usual means of providing this sudden closing force is to provide a small groove or bypass in the wall of the cylinder so that as the piston reaches the groove or bypass there is sudden release of pressurized air from the chamber past the piston. This sudden release and reduction in reactive force causes the piston to sharply accelerate towards the closed end of the cylinder thereby increasing the speed of closing of the door. A typical form of bypass is disclosed in Australian Pat. No. 544,943 and is provided in the cylinder of the present invention at a position 98 very close to the closed end of the cylinder.

However the provision of the bypass in the wall of the cylinder is fixed and cannot be adjusted.

With the door closer that is the subject of this invention, the bypass feature is adjustable. In the embodiment illustrated in FIGS. 1, 2 and 7 an adjustable airflow control means 70 is positioned at a selected position on the periphery of the cylinder 10. To provide the airflow control means the exterior of the cylinder 11 is provided with a thin walled membrane 120 defined by a rectangular cut-out 121 in the wall of the cylinder 11. A radially outwardly projecting block 122 is provided in the centre of the cut-out 121 with a radially extending arcuate slot 123 provided in one face 124. A second block 125 is provided to extend radially outwardly of the cylinder wall 11 at a position adjacent the first block 122 but off the thin walled membrane 120. The second block 125 also has a face 126 provided with an arcuate slot 127 opposite the slot 123 in the first block. The blocks 122 and 125 are spaced apart to define a gap 128. A screw 129 is arranged to be located within the gap 128 defined between the arcuate slots 123 and 127. As the screw is turned to enter the gap it forces the first block 122, which is on a weaker support than the second block 125, to deflect away from the second block 125. This deflection has the effect of pulling the thin walled membrane 120 radially outwardly at the foot of the second block 125 to thereby define a gap 131 between the periphery of the piston 20 and the interior of the cylinder wall. The width of the gap 131 varies depending on the degree of insertion of the screw 129. As shown in FIG. 1, a suitable shroud 134 extends radially outwardly of the exterior of the cylinder wall to protect the airflow control means 70.

Another form of airflow control means 70 is illustrated in FIG. 8 and comprises an internally threaded spigot 71, an annular buttress 72 projecting outwardly of the wall 73 of the cylinder past the spigot 71 and a screw 74 that screws into the internal thread of the spigot. The spigot 71 and its threaded bore defines a thin walled membrane 75 as the inner surface of the cylinder 10. By screwing the screw 74 into the spigot 71 as shown in the underside of FIG. 2, the underside of the head 76 of the screw abuts buttress 71 so that as the screw 74 is turned further, inward displacement of the screw into the spigot is prevented and the spigot is pulled radially outwardly of the cylinder to cause, as shown in FIG. 2, the membrane 75 to deflect outwardly. This would of course provide a gap 80 between the O-ring 32 of the piston 10 and that part of the cylinder wall. The gap between the O-ring 32 and the piston in the cylinder wall varies depending on the amount that the screw 74 is turned.

FIG. 8 illustrates the air control means 70 in use and shows a situation where the piston 20 has reached the point of the cylinder wall where the membrane 75 has been deflected outwardly. The drawing illustrates the gap 80 between the O-ring 32 of the piston 20 and the cylinder wall. The sudden release of air from the pressure chamber 40 past the O-ring 32 causes the spring to sharply accelerate the piston to effect slamming shut of the door. In FIG. 9 a further embodiment is illustrated whereby the screw is replaced by a nut 84 that in this embodiment is simply turned against an externally threaded spigot 85. At a similar annular buttress 72 of the kind illustrated in FIG. 2 is provided to act as an abutment for the underside of the nut.

In another embodiment illustrated in FIGS. 10 and 11 the spigot 90 extends radially outwardly of the cylinder wall past the buttress 91. The spigot is split into two halves 92, 93, so that as the screw 74 is screwed into the spigot, the halves 92, 93 are forced to diverge outwardly until they abut the corner of the buttress 91. This prevents further displacement of the halves 92, 93 of the spigot 90 so that on further rotation of the screw 74 the thin wall membrane at the base of the spigot is pulled upwardly to effect the outward flexing of the interior wall of the cylinder as illustrated in FIG. 11.

In the embodiment illustrated in FIGS. 12 to 14 the cylinder wall is provided with an arcuate ramp 100 that extends around a small cylindrical projection 101. The base of the projection is formed integrally with a thin walled membrane 102 of the wall of the cylinder. A locking disc 104 as shown in FIG. 13 has a circular upper surface 105 with a projecting bar 106 and a central aperture 107. The disc 104 is positioned to be rotatable on the cylindrical projection 101. The underside of the disc is provided with an arcuate ramp 109 which rides up the arcuate ramp 100 on the wall of the cylinder. As the ramps engage due to relative rotation of the disc on the cylindrical projection a cap 110 at the end of the projection prevents displacement to the disc relative to the projection so that on further turning, as the ramps engage, they have the effect of pulling up the base of the projection 101 and the membrane 102 radially outwardly thereby defining an increasing gap between the piston and the cylinder wall.

It is understood that more than one such airflow control means may be provided in the wall of the cylinder at selected positions so that by suitable adjustment a snapping action can be incorporated in the door closer at various positions during the closing operation.

As shown in FIG. 1 the arm 21 is provided with a plurality of equally spaced peripheral grooves 26 which are arranged to engage a resilient locking sleeve 27 that is mounted on the arm to be slidable thereto to engage against the end 22 of the cylinder. The location of the locking sleeve 27 on a groove 26 prevents the arm from withdrawing into the cylinder thereby preventing the door from closing. The locking sleeve 27 and is operation is described in more detail in the applicant's Australian Pat. No. 544,943.

The adjustability of the air control means 70 coupled with the adjustability of the bleed screw allows the operating parameters of the door closer to be adjusted more effectively to suit the particular requirements of a greater range of door weights. Instead of having to use different rates of spring within the door closer a single strong spring can be incorporated and the high spring force can be compensated by reducing the rate of by-pass and bleed of air.

The major component parts of the door closer, namely the cylinder, arm, locking mechanism brackets and piston are moulded in plastics. The use of flexible plastics material makes it easy to effect the displacement of the thin walled membrane of the cylinder wall to provide the adjustable air control means.

Although the preferred embodiments relate to door closers it is understood that the invention in its broadest aspects relates to pneumatic dampers for many uses other than as door closers.

Having described my invention, what I claim is:

1. A pneumatic damper comprising a cylinder closed at one end having a piston axially slidable therein to define a pressurizable chamber between the piston and the closed end of the cylinder, the piston having means to allow air to flow past the piston when the piston slides axially away from the closed end and to prevent airflow past the piston as the piston moves towards the closed end, an elongate arm secured to said piston to extend out of the cylinder, the arm being displaceable to cause the piston to slide within the cylinder, and an adjustable airflow control means on the wall of the cylinder at a selected position to selectively vary a gap between at least one part of the periphery of the piston and the adjacent part of the cylinder wall to allow variation of flow of air between the piston and cylinder wall at said selected position, to cause, in use, a sudden reduction in the air pressure within the chamber, wherein the adjustable airflow means comprises means external of the cylinder wall causing at least part of the internal cylinder wall to bendably deflect away from the adjacent part of the piston periphery.

2. The damper according to claim 1 wherein the adjustable airflow control means comprises means external of the cylinder wall causing at least part of the internal cylinder wall to bendable deflect away from the adjacent part of the piston periphery.

3. The damper according to claim 2, wherein that part of the cylinder wall that deflects is a membrane having a radially outwardly extending projection and means to deflect the projection thereby causing the base of the projection to pull the membrane radially outwardly.

4. The damper according to claim 3, wherein a second projection is provided adjacent the first projection but off the membrane, the two projections defining a gap therebetween and means arranged to be adjustably positioned in the gap to cause the first projection to deflect away from the second projection.

5. The damper according to claim 4, wherein the means to deflect the first projection comprises a screw that locates within the gap between the projections.

6. The damper according to claim 2 wherein that part of the cylinder wall that deflects is a membrane having a threaded spigot extending radially outwardly therefrom, a screw in threaded engagement with the spigot, and abutment means formed on the external surface of the wall on which the underside of the head of the screw engages so that as the screw turns, axial movement of the screw is prevented but the spigot and membrane are drawn outwardly to deflect the inner wall of the cylinder away from the periphery of the piston.

7. The damper according to claim 6 wherein the part of the wall of the cylinder that deflects away from the piston periphery is provided with a slot on the external surface, the base of which defines a thin walled membrane between the interior and exterior surface of the cylinder wall, the slot having a radially outwardly projecting boss formed integrally with the external surface of the membrane, the boss being split into two component parts defining a gap therebetween, rotatable adjustment means positioned within the gap so that in use rotation of the adjustment means causes the component parts to be forced apart to cause the membrane at the base of the boss to be pulled radially outwardly to cause a corresponding outward deflection of the membrane away from the periphery of the piston.

8. The damper according to claim 7 wherein the rotatable adjustment means comprises a screw that threadably engages the gap within the component parts of the boss.

9. The damper according to claim 7 wherein the rotatable adjustment means comprises a rotatable disc mounted on the boss, the disc having an inclined ramp on its underside so that rotation of the disc causes the ramp to pull the boss radially outwardly to deflect the membrane.

10. The damper according to claim 1 wherein more than one adjustable airflow control means is positioned along the length of the cylinder.

11. The damper according to claim 1 wherein an adjustable bleed valve is provided at said closed end to allow controlled release air pressure within the chamber.

12. The damper according to claim 11 wherein the adjustable bleed valve comprises a cap that threadably engages a hollow externally threaded spigot extending from the closed end of the cylinder, the cap having a core that extends into the hollow spigot, the core having a tapered bleed hole, the cross-section of which varies depending on the penetration of the core within the spigot so that in use adjustment of the cap on the spigot varies the rate of flow of air from within the chamber.

13. The damper according to claim 1 wherein the piston has an O-ring positioned in a groove on the periphery of the piston in a manner that displacement of the piston towards the closed end of the cylinder causes the O-ring to seal against the cylinder wall preventing flow of air past the piston and displacement of the piston away from the closed end allows air to flow past the piston and into the chamber.

14. The damper according to claim 1 further comprising biasing means urging the piston to the closed end of the cylinder.

15. The damper according to claim 14 wherein the biasing means comprises a spring positioned within the cylinder coaxial with the arm and acting between the piston and the end of the cylinder opposite the closed end.

16. The damper according to claim 1 wherein the cylinder, piston and elongate arm are moulded in plastics.

17. A pneumatic door closer comprising a cylinder closed at one end having a piston axially slidable therein to define a chamber between the piston and the closed end of the cylinder, the piston having means to allow air to flow past the piston when the piston slides axially away from the closed end and to prevent airflow past the piston as the piston moves towards the closed end, the cylinder being securable to one part of the door assembly, an elongate arm secured to said piston to extend out of the cylinder to be secured to another part of the door assembly, biasing means urging the piston to the closed end of the cylinder thereby compressing the air within the chamber, and an adjustable airflow control means on the wall of the cylinder at a selected position to selectively vary a gap between at least one part of the periphery of the piston and the adjacent part of the cylinder wall to allow variation of flow of air between the piston and cylinder wall, to cause, in use, a sudden reduction in the air pressure within the chamber.

* * * * *